May 12, 1959 J. V. GIESLER 2,886,245
CONSTANT FLOW THERMOSTATIC MIXING VALVE
Filed Sept. 8, 1954 2 Sheets-Sheet 2

INVENTOR.
Jean V. Giesler.
BY
HIS ATTORNEY

United States Patent Office 2,886,245
Patented May 12, 1959

2,886,245

CONSTANT FLOW THERMOSTATIC MIXING VALVE

Jean V. Giesler, Knoxville, Tenn., assignor to Robertshaw-Fulton Controls Company, Greensburg, Pa., a corporation of Delaware Application September 8, 1954, Serial No. 454,695

1 Claim. (Cl. 236—12)

This invention relates to constant flow thermostatic control valves and more particularly to combined thermostatic and constant flow control valves constituting a unit for controlling the flow of fluid derived from a plurality of sources and delivered to a single place of consumption. Although the invention is susceptible to a variety of uses as will be apparent to those skilled in the art, the invention has particular utility when applied as a valve unit for controlling the flow of either hot water or cold water or a mixture thereof to a washing machine and accordingly will be explained as applied thereto.

The present invention combines the function of controlling flow in a valve of the described type with the function of controlling the temperature of the mixed water. In carrying out the invention, there is provided a valve housing having a single outlet passage and a pair of inlet passages for respective connection to sources of hot and cold water and a valve port connecting each of said passages with said outlet passage. An independently actuated valve mechanism is associated with each of said ports, said valve mechanisms being operable independently to open communication between either or both of said inlet passages and said outlet passage. Constant flow means is provided in the outlet passage and being responsive to fluctuating fluid pressure in the valve housing for maintaining a constant rate of flow of fluid to the source of consumption. Thermostatic valve means are provided for the cold inlet passage and for the passage connecting said inlet passages.

It is accordingly an object of the present invention to utilize a mixing valve that will, once supplied with hot and cold water, deliver mixed water at substantially constant temperature and flow regardless of wide variations in supply water temperatures and pressures.

Another object is to thermostatically control a fluid mixture using component parts which may be manufactured by low cost stamping or machine operations from readily available stock materials.

Another object of the invention is to reduce the bulkiness of the mixing valve so that the simple components may be readily assembled by mass production operations.

Other objects and advantages will become apparent from the following description taken in connection with the accompanying drawings wherein.

Figure 1:
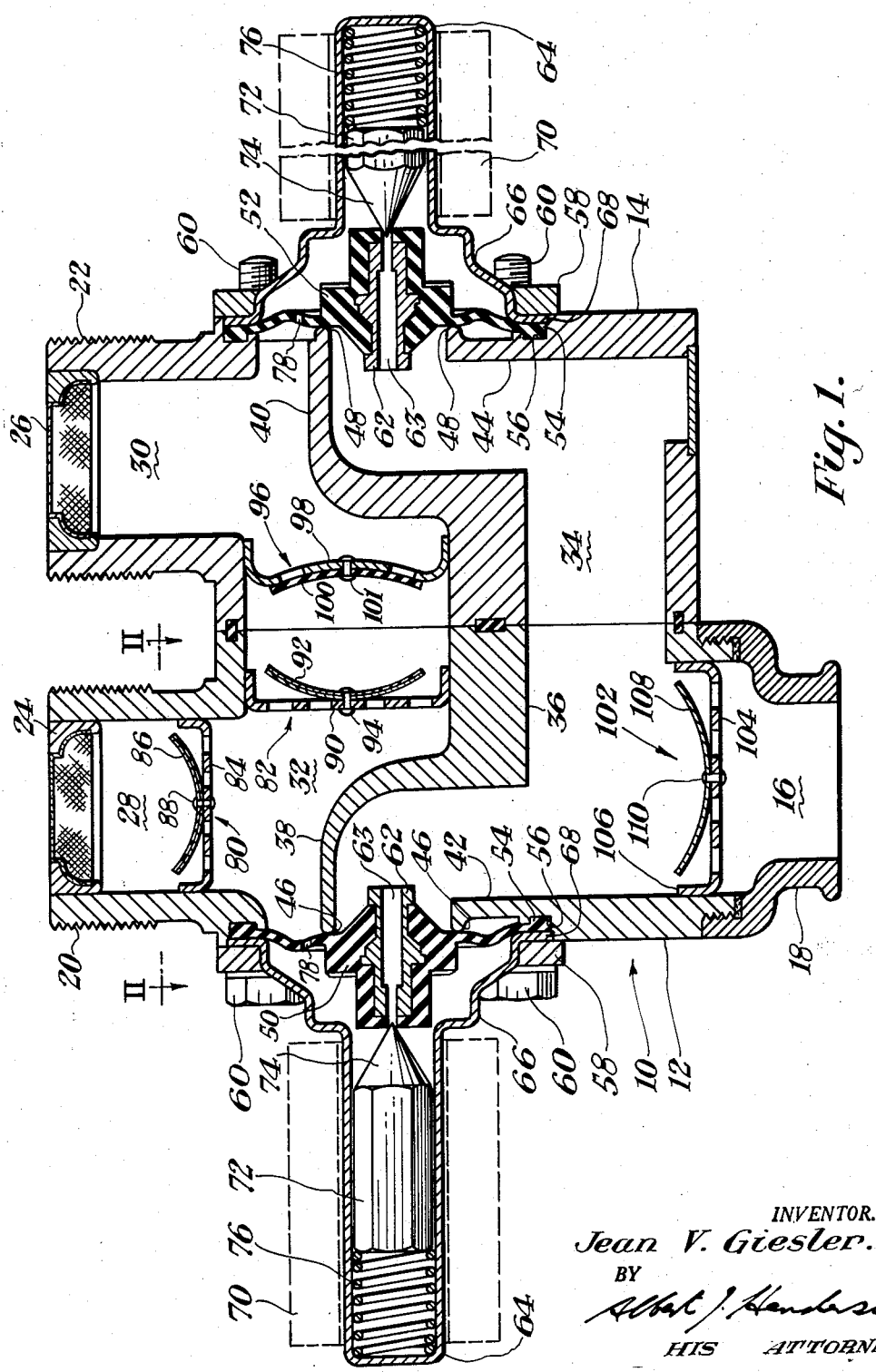
Fig. 1 is a sectional view of the present invention.

Referring in detail to the drawing, 10 designates a single housing of any suitable size or construction comprising the body members 12 and 14 and having a single outlet passage 16 with which may communicate any suitable conduit by means of a nipple 18 for conveying liquid from the housing 10 to the place of consumption, as for example, a washing machine.

The housing 10 is provided with a pair of inlet nipples 20, 22 here shown as threaded for connection with any suitable conduit as, for example, conduits leading from a source of cold water and a source of hot water respectively. Each of the nipples 20, 22 has mounted therein strainers 24, 26 respectively, and has passages 28, 30 communicating respectively with an intersecting chamber 32. A mixing chamber 34 is provided in the housing 10 and is separated from the intersecting chamber 32 by a partition 36 which is made integral with the housing members 12, 14.

The partition 36 has generally shell-like portions 38, 40 integrally formed at the ends thereof and these serve to cooperate with the sides 42, 44, respectively, of the housing 10, to form annular valve seats 46, 48 for a pair of diaphragm valves 50, 52, respectively. The diaphragm valves 50, 52 are of the conventional type being formed from flexible material and these are attached to the open ends of the valve housing 10 by means of peripheral sealing flanges 54 seated into annular grooves 56 formed in the valve housing 10. An effective seal is provided between the valve housing 10 and the diaphragm valves 50, 52 by the compressing force of the locking rings 58 which are made to overlie the flanges 54. The locking rings 58 are fastened to the valve housing 10 by any suitable means, and in Figure 1, for this purpose, a plurality of bolts 60 are shown as projecting through the valve housing 10 for fastening both locking rings 58. The diaphragm valves 50, 52 are provided with generally cylindrical, hollow metal, inserts 62 forming openings 63 through the center of the diaphragm valves 50, 52.

Each of the diaphragm valves 50, 52 is controlled by a solenoid operated valve mechanism which may be identical in construction and operation, wherefore only one will be described in detail. An elongated tubular casing 64 is flared out at its inner end into a cup portion 66 having a flange 68 at the extreme end thereof. The flange 68 is interposed between the locking ring 58 and the outer surface of the sealing flanges 54 of the diaphragm valves 50, 52 to be secured thereto. The casing 64 constitutes a core on which a coil of a solenoid 70 may be wound as is well known to those skilled in the art. An armature 72 is slidable in and guided by the inner walls of the casing 64 and is provided with a generally conical end 74 which is adapted to seat upon the diaphragm valves 50, 52 and effectively control the flow of water through the opening 63 between the mixing chamber 34 and the chamber formed in the casing 64 for a purpose which will be disclosed hereinafter. The spring 76 normally biases the armature 72 toward the valve casing so that the conical end 74 effectively restricts the flow of water through the opening 63 substantially as shown in the drawing. Movement of the armature 72 in opposition to the bias of the spring 76 is obtained by the energization of the solenoid 70 which is effectively connected to a suitable source of electrical energy and a valve control mechanism (not shown).

As is well known in the art, the area exposed to the fluid pressure on the solenoid side of the diaphragm valve 50 exceeds the annular surface area exposed thereto on the other side thereof, thereby causing the diaphragm valve 50 to seat upon the valve seat 48 and prevent the flow of fluid from the intersecting chamber 32 and the mixing chamber 34. Upon energization of the solenoid 70, the armature 72 is moved away from the diaphragm valve 50 against the bias of the spring 76 so as to exhaust the pressure behind that side of the diaphragm valve through the opening 63 to the mixing chamber 34. Equalization of the pressure on both sides of the diaphragm valve 50 causes the movement of same away from its seat 48. A bleed opening 78 is provided in the diaphragm valve 50 allowing water to flow from the intersecting chamber 32 to the solenoid side thereof and equalize the pressure on both sides of the diaphragm valve 50 when the solenoid 72 is deenergized. Similarly, the diaphragm valve 52 located adjacent the hot water inlet nipple 22 is actuated by its respective solenoid and functions in the identical manner as that of the above discussed valve 50.

Figure 2:
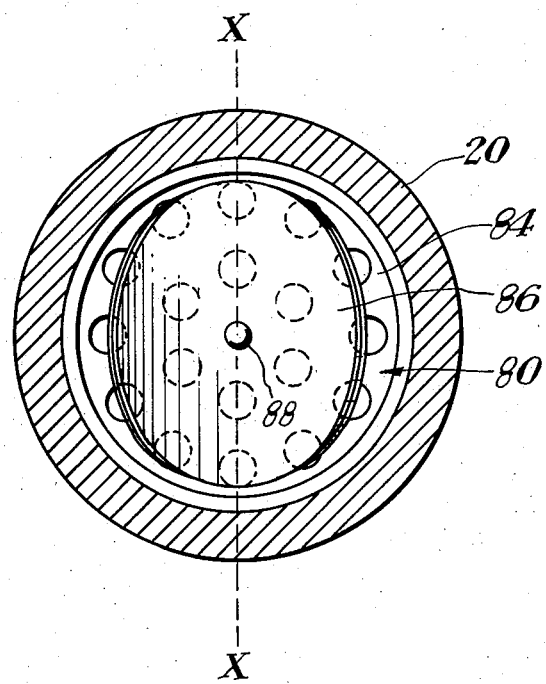
Fig. 2 is an enlarged detail of a part of the embodiment of Fig. 1 taken along the line II—II.

Referring now in more detail to the rate of flow and temperature control means of this invention, there is shown in Figure 1 a pair of temperature control means generally indicated at 80, 82 and located in the cold water inlet nipple 20 and intersecting chamber 32, respectively. Since these control means are identical in construction, only one will be discussed in detail and for this construction, attention is directed to Figure 2 of the drawing wherein a cup-shaped perforated member 84 is shown secured to the inside surface of the nipple 20 by any suitable means.

A bimetallic element 86 is shown bent along an axis x—x thereof to form a curved cross-section disk which is secured to the plate 84 at the center thereof by a rivet 88. Similarly, the temperature control means 82 comprises a cup-shaped perforated supporting member 90 and a bimetallic disk 92 bent along an axis thereof, secured to the supporting plate 90 by a rivet 94; the flanges of the member 90 being secured to the inner walls of the valve housing 10 by any suitable means. In effect, the temperature control means 80, 82 are rate of flow valves responsive to temperatures within the enclosing respective chambers. The periphery of the disks 86, 92 cooperate with the walls of their respective chambers to form an orifice therebetween and the periphery of the bimetallic disks 86, 92 are so constructed that upon flexing of the same about their respective axes, considerable clearance is maintained between the edges thereof and the respective supporting wall structure. This clearance will allow for complete travel of water around the edges of the disk when flexing of the disk occurs as will be described hereinafter.

The temperature control means 80 which is located in the cold water inlet nipple 20 is made such that increasing cold water temperatures will increase the rate of flow of water through the unit while the temperature control means 82, located in the intersecting chamber 32, is constructed so that decreasing hot water temperatures will increase the rate of flow. Specifically, these effects are accomplished by arranging the bimetallic materials of the disk 86 so that increasing temperatures will cause the disk to curl to a smaller radius of bend thereby allowing more cold water to pass between the periphery thereof and the inner walls of the nipple 20. In like manner, the bimetallic materials of the disk 92 are constructed so that increasing temperatures will cause the disk to uncurl to a greater radius of bend thereby restricting somewhat the flow of water between the periphery thereof and the walls defining the intersecting chamber 32.

In operation, when the temperature of the water reacts upon the disks 86, 92, the disks start to curl or uncurl, as the case may be, along their respective axes thereby varying the effective area between the respective wall structure and the peripheries of the disks. Thus, it is obvious that by varying this effective area, the amount of water passing through either of the control means 80, 82 will be varied accordingly.

Interposed between the temperature control means 82 and the hot water inlet chamber 30, the intersecting chamber is provided with a check valve assembly 96 of the conventional type. The assembly 96 is formed by a perforated cup member 98 and a flexible disk 100 secured at its center to the center of the member 98 by a rivet 101. The assembly is secured to the intersecting chamber 32 by any suitable means. As is apparent, in the use of these check valves, the flow of water is permitted to flow in one direction only and as illustrated in the drawing, hot water is allowed to flow from the inlet chamber 30 through the check valve 96 into the intersecting chamber 32, but the "backing up" of the cold water or mixed water into the inlet chamber 30 is prevented by the closing action of the flexible disk 100.

Located in the outlet passage 16, adjacent the mixing chamber 34 is a pressure responsive rate of flow control valve generally indicated at 102 and which is similar to that shown in application Serial No. 454,718, filed by Charles D. Branson on September 8, 1954, now abandoned, so only herein described in sufficient detail to make my present invention readily understandable.

The rate of flow control valve 102 comprises a cup-shaped supporting member 104 having an annular rim 106 which may be secured to the walls of the valve casing by any suitable means. The central portion of the member 104 is perforated and a spring disk 108 is secured to the member 104 at the centers thereof by a rivet 110. The spring disk 108 is constructed of thin stamped sheet metal and is bent around one of its axes in much the same manner as that of the bimetallic disks 86 and 92. The periphery of the spring disk 108 has a diameter only slightly smaller than the inside diameter of the chamber enclosing the same and considerable clearance is provided between the periphery of the spring disk 108 and the side walls of the outlet passage 16. This clearance will allow free travel of water around the edges of the spring disk 108 when the flattening of the disk occurs due to the increase of pressure on the upstream side of the supporting member 104. The edges of the spring disk 108 curl or uncurl in the event of a decrease or increase of pressure of the water in the mixing chamber 34 thereby maintaining the constant flow of water through the valve 102.

In the operation of the present invention, assuming that the sources of hot and cold water are connected to the inlet nipples 22, 20, respectively, when the mixing valve 10 is assembled as shown in Figure 1, and when the diaphragm valves 50, 52 are seated upon their respective valve seats, if mixed hot and cold water is desired, the solenoid 70, associated with the diaphragm valve 50 is suitably energized causing the valve 50 to unseat from its valve seat 46, permitting the passage of cold water through the thermostatic control means 80 by way of the nipple 20 and hot water through the thermostatic control means 82 from the hot water nipple 22. Cold water entering from the nipple 20 and hot water entering from the nipple 22 are combined in the portion of the intersecting chamber 32 adjacent the valve 50 and this combined fluid is permitted to pass through the valve seat 46 into the mixing chamber 34 to be more thoroughly mixed therein and out of the valve housing 10 by way of the outlet passage 16.

If the temperature of the cold water entering through the nipple 20 decreases, the bimetallic material in the disk 86 tends to uncurl the disk thus controlling the cold water flowing therethrough at a lower rate. Conversely, if the temperature of the water increases, the disk 86 tends to curl permitting more cold water to pass therethrough. In the case of the hot water thermostatic control means 82, the bimentallic material of the disk 92 reacts to increasing temperatures such that the rate of flow therethrough is decreased and to decreasing temperatures such that the flow is increased. The final temperature of the mixed water in the mixing chamber 34 is a function of the temperature of the hot and cold water supplies as they reach the chamber 32 and the proportions in which the two are mixed. In the arrangement shown, the thermostatic control means 80, 82 are such that they will admit water to the mixing chamber 34 in the desired proportion at different supply temperatures.

In the event that hot water is desired, the solenoid 70 associated with the diaphragm valve 52 is suitably energized causing the unseating of the valve 52 and permitting the flow of hot water from the inlet nipple 22 directly to the mixing chamber 34 at the temperature of the hot water supply. The check valve 96 prevents the entry of cold water into that side of the valve housing 10 when the diaphragm valve 52 is unseated.

Mixed hot and cold water in the mixing chamber 34 is discharged through the outlet passage 16 and is regulated to a constant flow by the rate of flow control valve 102. The valve 102 will regulate the flow of water supply to it regardless of whether the water supply enters the chamber 34 by the actuation of the valve 50 or the valve 52.

The thermostatic control means 80, 82 do not effect the function of the constant flow valve 102. However, due to the arrangement of these elements in their respective passages, a constant temperature-constant flow of the fluid in the outlet passage 16 will be maintained. Thus, if the temperature of the cold water is too high, then the increase of the amount of cold water is enough to offset the temperature of the hot water and the temperature of the mixed hot and cold water in the mixing chamber 34 will not be effected and any increase in pressure caused by the increased amount of cold water will be throttled by the constant flow device 102. Similarly, if the temperature of the incoming hot water into the intersecting chamber 32 is too high, the amount of hot water entering this chamber is decreased so that the temperature of the mixed fluid in the mixing chamber 34 is not affected and the decrease of pressure therein caused by the decrease in the amount of hot water entering the intersecting chamber 32 will cause the spring disk 108 of the constant flow means 102 to curl thereby allowing a greater amount of water to pass therethrough.

Thus, it is evident that the mixing valve of this invention will furnish not only hot fluid of a known temperature, but also a mixed fluid having a temperature which is thermostatically regulated within a predetermined range of temperatures desired, either of which will be discharged at a constant flow. It is apparent that the thermostatic devices and the constant flow device will act in the same manner to deliver mixed fluid at a fixed rate of flow at constant temperatures regardless of variations in hot and cold water supply temperatures and pressures, or variations in the difference between the hot and cold water pressure. A simple compact valve unit has been provided composed of parts which are easy to fabricate and assemble and, at the same time, the unit comprises a highly efficient constant flow thermostatic hot and cold water mixing valve.

Various changes may be made in the details of construction and arrangement of parts within the scope of the appended claim.

I claim:

In a water mixing valve for hot and cold water, the combination comprising a housing having a mixing chamber and an intersecting chamber separated by a partition, a valve seat formed on each end of said partition and said housing for connecting said intersecting chamber with said mixing chamber, a hot water inlet communicating with one end of said intersecting chamber, a cold water inlet communicating with an opposite end of said intersecting chamber, an outlet communicating with said mixing chamber, an independently actuated valve mechanism associated with each valve seat for controlling a flow of water into said mixing chamber, first thermally responsive means positioned in said cold water inlet for controlling the rate of flow from said cold water inlet to said intersecting chamber, second thermally responsive means positioned in said intersecting chamber remotely from the said opposite end thereof and controlling the rate of flow from said hot water inlet through said intersecting chamber, a check valve mechanism positioned in said intersecting chamber remotely from the said one end thereof to prevent a flow of water from said intersecting chamber through the said one end thereof, and a constant flow mechanism positioned in said outlet for maintaining a constant rate of flow from said mixing chamber through said outlet.

References Cited in the file of this patent

UNITED STATES PATENTS

| | | |
|---|---|---|
| 1,806,530 | Giesler | May 19, 1931 |
| 1,807,040 | Leonard | May 26, 1931 |
| 1,806,072 | Levy | May 19, 1934 |
| 2,109,628 | Alban | Mar. 1, 1938 |
| 2,221,750 | Ashby et al. | Nov. 19, 1940 |
| 2,558,962 | Kempton | July 3, 1951 |
| 2,620,134 | Obermaier | Dec. 2, 1952 |
| 2,647,692 | Keller | Aug. 1, 1953 |
| 2,772,833 | Chace | Dec. 4, 1956 |